(12) United States Patent
Kim et al.

(10) Patent No.: US 11,925,922 B2
(45) Date of Patent: Mar. 12, 2024

(54) METAL MATERIAL HAVING IMPROVED CORROSION RESISTANCE AND METHOD OF IMPROVING CORROSION RESISTANCE OF METAL MATERIAL SURFACE USING OXYGEN REDUCTION CATALYST

(71) Applicant: POSTECH Research and Business Development Foundation, Pohang-si (KR)

(72) Inventors: Yong-Tae Kim, Pohang-si (KR); Jaeik Kwak, Pohang-si (KR); Hyoung Seop Kim, Pohang-si (KR); Sujung Son, Pohang-si (KR); Sang-Mun Jung, Pohang-si (KR)

(73) Assignee: POSTECH RESEARCH AND BUSINESS DEVELOPMENT FOUNDATION, Pohang-si (KR)

( * ) Notice: Subject to any disclaimer, the term of this patent is extended or adjusted under 35 U.S.C. 154(b) by 0 days.

(21) Appl. No.: 17/687,919

(22) Filed: Mar. 7, 2022

(65) Prior Publication Data
US 2023/0044742 A1 Feb. 9, 2023

(30) Foreign Application Priority Data
Aug. 4, 2021 (KR) .......................... 10-2021-0102345

(51) Int. Cl.
*B01J 23/89* (2006.01)
*B01J 35/00* (2006.01)
(Continued)

(52) U.S. Cl.
CPC ........... *B01J 23/8906* (2013.01); *B01J 35/19* (2024.01); *B01J 35/31* (2024.01); *B01J 37/0215* (2013.01); *C25D 11/26* (2013.01)

(58) Field of Classification Search
CPC ................ B01J 35/0006; B01J 23/8906; B01J 35/0026; B01J 37/0215; C25D 11/26
See application file for complete search history.

(56) References Cited

U.S. PATENT DOCUMENTS 4,473,454 A * 9/1984 Asano ................... C25B 11/095
427/376.6
4,906,524 A * 3/1990 Takao ................... C23C 14/024
428/457

(Continued)

FOREIGN PATENT DOCUMENTS

| JP | H05-148674 | 6/1993 |
| KR | 10-1066980 | 9/2011 |
| KR | 10-2017-0097579 | 8/2017 |

OTHER PUBLICATIONS

KIPO, Office Action of the corresponding Korean Patent Application No. 10-2021-0102345 dated Nov. 14, 2022.

*Primary Examiner* — Cam N. Nguyen
(74) *Attorney, Agent, or Firm* — LEX IP MEISTER, PLLC (57) ABSTRACT

The present invention relates to a method of improving the corrosion resistance of a metal substrate surface using an oxygen reduction catalyst, which may improve the corrosion resistance of the metal substrate surface by coating the metal substrate surface with the oxygen reduction catalyst so that the metal substrate surface is changed to a passive state through the action of the oxygen reduction catalyst in an environment in which a stable oxide layer is not spontaneously formed on the metal substrate surface. The present invention has an advantage in that it can dramatically improve the corrosion resistance of the metal substrate under a corrosive environment by allowing a recoverable oxide layer to be formed on the metal substrate surface through the action of the oxygen reduction catalyst, applied to the (Continued)

surface, even in an environment in which an oxide layer is not spontaneously formed on the metal substrate.

10 Claims, 9 Drawing Sheets

(51) Int. Cl.
    *B01J 37/02*          (2006.01)
    *C25D 11/26*         (2006.01)

(56) References Cited

U.S. PATENT DOCUMENTS

| | | | |
|---|---|---|---|
| 5,135,709 A * | 8/1992 | Andresen | G21C 17/0225 376/305 |
| 9,797,036 B2 * | 10/2017 | Liu | C23C 8/40 |
| 2010/0261034 A1 * | 10/2010 | Cardarelli | C25D 5/10 428/688 |
| 2014/0144783 A1 * | 5/2014 | Yoon | C25D 5/42 427/327 |
| 2016/0326654 A1 * | 11/2016 | Jeong | C01F 5/14 |

* cited by examiner

METAL MATERIAL HAVING IMPROVED CORROSION RESISTANCE AND METHOD OF IMPROVING CORROSION RESISTANCE OF METAL MATERIAL SURFACE USING OXYGEN REDUCTION CATALYST

CROSS-REFERENCE TO RELATED APPLICATION

This application claims the benefit of Korean Patent Application No. 10-2021-0102345, filed on Aug. 4, 2021, in the Korean Intellectual Property Office, the disclosure of which is incorporated herein in its entirety by reference.

TECHNICAL FIELD

The present invention relates to a method for improving the corrosion resistance of a metal substrate surface using an oxygen reduction catalyst. More specifically, the present invention relates to a method that can enhance the corrosion resistance of the metal substrate surface by coating the metal substrate surface with the oxygen reduction catalyst so that the metal substrate surface changes to a passive state through the action of the oxygen reduction catalyst in an environment in which a stable oxide layer is not spontaneously formed on the metal substrate surface. This research was supported by National R&D Program through National Research Foundation of Korea (NRF)funded by Ministry of Science and ICT(2019M3D1A1079306).

BACKGROUND

Surface treatment methods that are used to prevent the corrosion of metal materials are roughly divided into a method of forming a sacrificial electrode by plating a steel surface with zinc, and a method of blocking a surface against a corrosive environment by coating the surface with an organic paint.

Among them, the method of forming the sacrificial electrode is a method in which a corrosion reaction is concentrated on the sacrificial electrode through plating a metal surface to be protected against corrosion with a relatively common or inexpensive metal or alloy. On the other hand, the method of protecting a surface against a corrosive environment is subdivided into a method of blocking an oxidizing environment by densely coating a surface with insulator, such as organic material, that is not involved in the corrosion reaction and a method of preventing the corrosion of a metal by forming a dense and stable oxide layer by initial anodizing.

Among the conventional methods of preventing the corrosion of metal materials, the method of preventing corrosion using the sacrificial electrode is a method of inducing a corrosion reaction to corrode only the sacrificial electrode, not a method of blocking corrosion, and thus after the formed sacrificial electrode is completely corroded, the corrosion of the metal to be protected against corrosion begins. Thus, the method of preventing corrosion using the sacrificial electrode is merely a method of simply extending the life of the metal to be protected against corrosion in a corrosive environment and has a limitation in that it cannot impart anti-corrosion properties to the semi-permanent metal to be protected against corrosion. In addition, it has a problem in that, when the surface of the metal to be protected against corrosion is exposed due to damage to the plating layer (i.e., sacrificial electrode), the corrosion of the plating layer is accelerated.

Meanwhile, the method of protecting a surface against a corrosive environment may exhibit excellent anti-corrosion properties in the initial stage of use of the product but has a problem in that local corrosion may occur rapidly at the end of the coating or at the portion where damage to the coating layer has occurred, resulting in permanent damage to the metal material to be protected against corrosion. Thus, the method of protecting a surface against a corrosive environment has limitations in that the coating layer is vulnerable to damage and the coating layer or the oxide layer formed by anodizing does not recover once damaged, and thus care must be taken not to damage the coating layer during the use of the product. Details regarding the method of improving the corrosion resistance of a metal by forming an oxide layer by anodizing are already disclosed in detail in Prior Art Document 1 and the like.

In addition to the above-described methods, a method of preventing corrosion using a Ti—Pd alloy or the like, which is obtained by alloying a noble metal capable of inducing a hydrogen reduction reaction and is capable of suppressing a corrosion reaction in an acid solution, has been proposed. However, this method still has a disadvantage in that the kind of metal, on which an oxide layer having an anti-corrosion effect may be formed upon the occurrence of a hydrogen reduction reaction, is limited, and in that the metal is not economically practical.

Thus, the conventional methods of preventing the corrosion of metal materials still have a problem and limitation in that, when a sacrificial electrode, coating layer or oxide layer formed on the surface of a metal material in order to impart corrosion resistance is completely corroded or damaged, it is impossible to prevent the corrosion of the metal material. Therefore, there is a need to develop a method that can improve corrosion resistance by allowing an oxide layer to be spontaneously formed on the surface of a metal material in a corrosive environment in order to extend the life and reduce the maintenance cost of the metal material and prevent the risk of safety accidents.

PRIOR ART DOCUMENTS

Patent Documents

Prior Art Document 1: Korean Patent Application Publication No. 10-2019-0054663 (published on May 22, 2019)

SUMMARY

The present invention has been made in order to solve the limitation and problem occurring in the above-described conventional methods of preventing the corrosion of metal materials, and an object of the present invention is to provide a method capable of improving the corrosion resistance of a metal material by allowing a recoverable oxide layer to be spontaneously formed on the surface of the metal material through the reduction reaction of an oxygen reduction catalyst, applied to the surface, even in an environment (such as a corrosive environment) in which an oxide layer is not spontaneously formed on the metal material surface.

To achieve the above object, the present invention provides a method of improving the corrosion resistance of a metal substrate surface using an oxygen reduction catalyst, the method comprising: contaminant removal step of removing contaminants from the metal substrate surface whose corrosion resistance is to be improved, by grinding the surface; an organic substance removal step of removing an organic substance from the surface by washing the metal substrate surface, from which the contaminants has been removed, sequentially using acetone, ethanol and distilled water; and an oxygen reduction catalyst coating step of coating the metal substrate surface with the oxygen reduction catalyst.

In the method, the oxygen reduction catalyst coating step may comprise forming a coating layer by sputtering a noble metal, selected as the oxygen reduction catalyst, on the metal substrate surface under an argon atmosphere. Here, the noble metal may be any one selected from among platinum, palladium, iridium, and rhodium.

In addition, the coating layer formed by sputtering the noble metal on the metal substrate surface preferably has a thickness of 0.8 nm or more.

Meanwhile, in the method of improving the corrosion resistance of a metal substrate surface using an oxygen reduction catalyst according to the present invention, the coating layer may be formed by uniformly dispersing M-N—C-based catalyst powder as the oxygen reduction catalyst in a mixed solution of isopropyl alcohol (IPA) and Nafion to obtain a dispersion, and applying a predetermined amount of the dispersion to the metal substrate surface, followed by sufficient drying.

Specifically, the oxygen reduction catalyst coating step comprises: a mixture solution preparation step of preparing a mixture solution by adding the M-N—C-based catalyst powder to the mixed solution of isopropyl alcohol (IPA) and Nafion; an ultrasonic dispersion step of uniformly dispersing the M-N—C-based catalyst powder by applying ultrasonic waves to the mixture solution prepared in the mixture solution preparation step; an application step of applying a predetermined amount of the dispersed mixture solution, in which the M-N—C-based catalyst powder has been uniformly dispersed through the ultrasonic dispersion step, at least once to the metal substrate surface; and a coating layer forming step of forming the coating layer by drying the applied dispersed mixture solution. Here, the application step and the coating layer forming step may be sequentially repeated at least once in order to control the thickness of the coating layer, formed after drying after application to the metal substrate surface, and the amount of the oxygen reduction catalyst per unit area.

Meanwhile, in the mixture solution preparation step, high-purity pure water may be further included, which functions to control the concentration of the mixture solution suitable for dispersing the M-N—C-based catalyst powder.

Here, M in the M-N—C-based catalyst that is used in the present invention represents a transition metal. Thus, as the M-N—C-based catalyst serving as the oxygen reduction catalyst, a Fe—N—C catalyst was used in an example of the present invention. However, the Fe—N—C catalyst may be replaced with a Co—N—C, Ni—N—C, Mn—N—C or Cu—N—C catalyst having the same effect. The metal substrate is preferably a Co—Cr—Mn—Fe—Ni alloy.

In addition, when the Fe—N—C-based catalyst is selected and applied to the Co—Cr—Mn—Fe—Ni alloy to form the coating layer, the coating layer preferably has a density of 4 $\mu g/cm^2$ or more. Even when the coating layer is formed by coating the metal substrate surface with the oxygen reduction catalyst at this density per unit area, the metal substrate composed of the Co—Cr—Mn—Fe—Ni alloy material may have corrosion resistance.

The present invention has an advantage in that it is possible to dramatically improve the corrosion resistance of a metal substrate in a corrosive environment by allowing a recoverable oxide layer to be formed on the surface of the metal substrate through the action of the oxygen reduction catalyst, applied to the surface, even in an environment in which an oxide layer is not spontaneously formed on the metal substrate surface.

In addition, the present invention has another advantage in that it is possible to not only slow down the corrosion rate in a corrosive environment, but also to induce recovery of the corrosion resistance by allowing an oxide layer to be formed on the metal substrate surface through the action of the oxygen reduction catalyst even when the surface layer is degraded or damaged to a certain extent.

In addition, the present invention has another advantage over the conventional corrosion prevention method in that it may be applied to a solution containing a certain amount or more of dissolved oxygen and may be applied to most alloy materials, suggesting that it has excellent applicability and versatility and is economical.

DETAILED DESCRIPTION

Hereinafter, embodiments and effects of the present invention will be described in detail with reference to the accompanying drawings.

Figure 1:
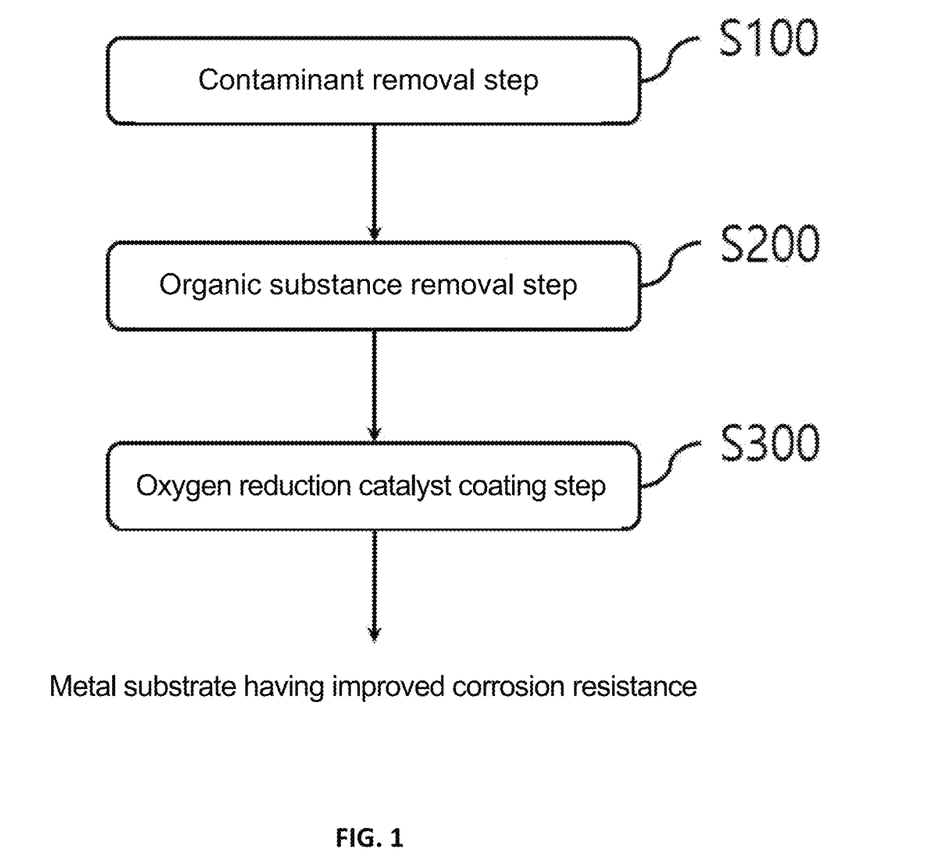
FIG. 1 shows an overall process of a method of improving the corrosion resistance of a metal substrate surface using an oxygen reduction catalyst according to the present invention.

FIG. 1 shows an overall process of a method of improving the corrosion resistance of a metal substrate surface using an oxygen reduction catalyst according to the present invention.

Contaminant removal step (S100) is a step of physically removing contaminants from the surface of a metal substrate by grinding the surface. Examples of metal substrates to which the present invention is applicable include any alloys, such as chromium (Cr), stainless steel, high-entropy alloy, aluminum (Al) alloys, on which an oxide layer may perform its role within the potential window of water. However, in an example of the present invention, an alloy comprising a mixture of Co—Cr—Mn—Fe—Ni components was selected as the metal substrate.

An organic substance removal step (S200) is a step of removing an organic substance from the metal substrate surface by washing the metal substrate surface, from which the contaminants has been removed, sequentially using acetone, ethanol, and distilled water. In this step, for efficient removal of the organic substance, the surface is preferably washed using ultrasonic waves.

An oxygen reduction catalyst coating step (S300) is a step of coating the metal substrate surface, from which the contaminants and the organic substance have been removed through the respective steps, with an oxygen reduction catalyst.

A method of coating the metal substrate surface with the oxygen reduction catalyst varies depending on whether the oxygen reduction catalyst is a noble metal-based catalyst or a non-noble metal-based catalyst. As the oxygen reduction catalyst, it is possible to use either a noble metal catalyst such as platinum (Pt), palladium (Pd), iridium (Ir), or rhodium (Rh), or a transition metal (M)-N—C-based non-noble metal catalyst such as Fe—N—C, and it is generally preferable to use a catalyst known to have superior oxygen reduction characteristics.

In Example 1 according to the present invention, platinum (Pt) was selected as an oxygen reduction catalyst and sputtered uniformly on a Co—Cr—Mn—Fe—Ni alloy, selected as the metal substrate, under argon gas. In this case, the thickness of the platinum (Pt) coating layer was each of 0.4 nm and 0.8 nm, and the effectiveness of the method of improving corrosion resistance according to the present invention was tested by measuring the corrosion resistance improvement effect at each coating layer thickness.

In addition, in Example 2 according to the present invention, a Fe—NC dispersion solution prepared through the following preparation process was spray-applied to the surface of a metal substrate made of a Co—Cr—Mn—Fe—Ni alloy, and then dried, thereby forming a coating layer.

Specifically, in the mixture solution preparation step, a mixture solution was prepared by mixing 12 ml of isopropyl alcohol (IPA), 0.5 ml of Nafion and 2.5 mg of Fe—N—C. Then, in the ultrasonic dispersion step, ultrasonic waves were applied to the prepared mixture solution for 1 hour so that the Fe—N—C powder was uniformly dispersed. In the application step, a predetermined amount of the dispersed mixture solution, in which the Fe—N—C-based catalyst powder has been uniformly dispersed through the ultrasonic dispersion step, applied to the surface of a metal substrate made of the Co—Cr—Mn—Fe—Ni alloy material. In the coating layer forming step, the dispersed mixture solution applied to the surface of the metal substrate was dried for at least 6 hours to form a coating layer. In this step, the amount of coating layer applied was controlled so that the oxygen reduction catalyst layer had a density of 4 µg/cm².

Figure 2:
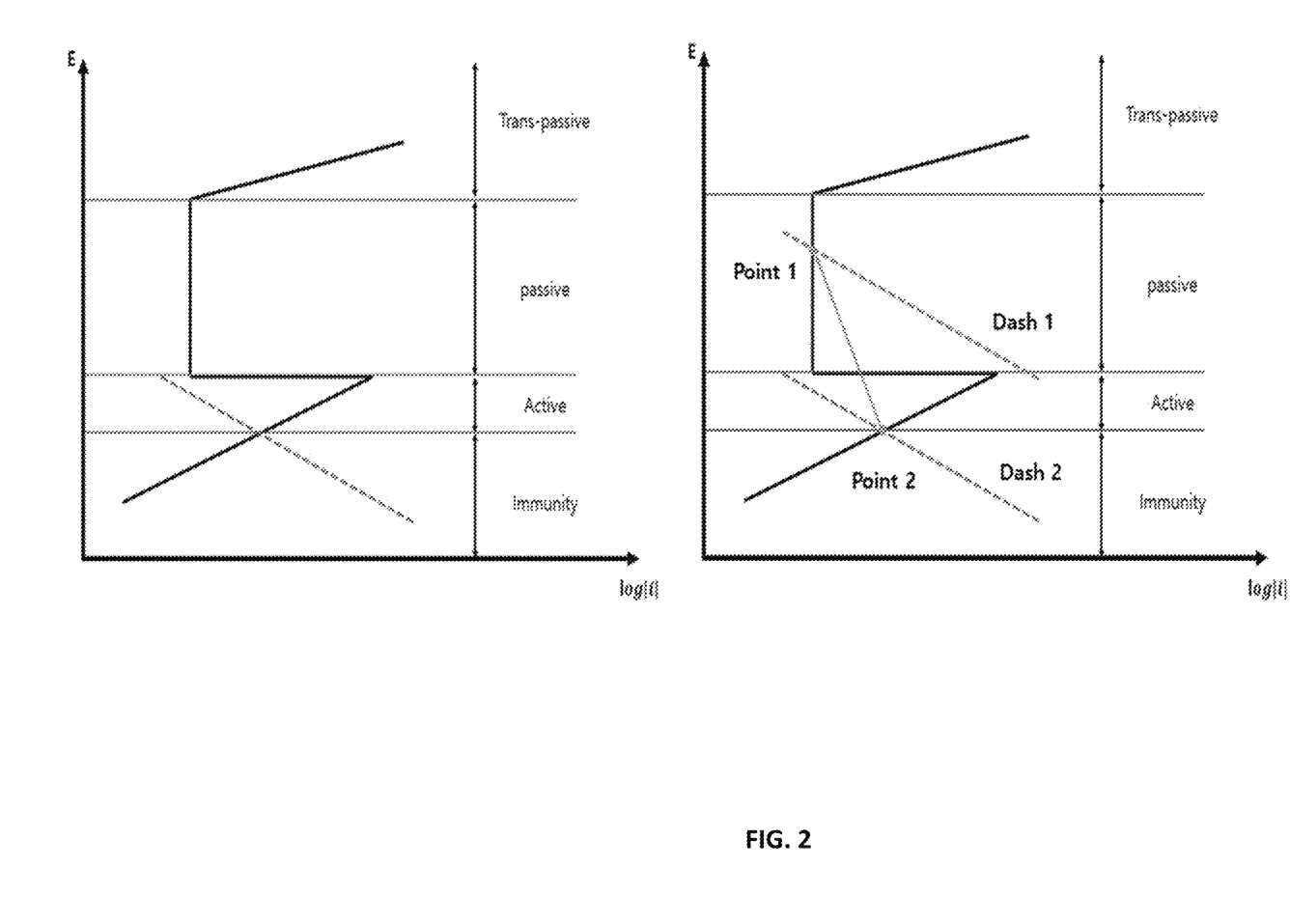
FIG. 2 shows a comparison of corrosive environments on a metal substrate in a solution through the correlation between current and current density depending on whether or not the metal substrate has been coated with an oxygen reduction catalyst.

FIG. 2 shows a comparison of corrosive environments on a metal substrate in a solution through the correlation between current and current density depending on whether or not the metal substrate is coated with an oxygen reduction catalyst.

As shown in the left of FIG. 2, the corrosive environment in the corrosive solution is divided into immunity, active, passive and trans-passive conditions. Among them, the regions with excellent corrosion resistance are the immunity and passive regions. Among these regions, the immunity region refers to a state in which corrosion reaction does not occur thermodynamically, and the passive region refers to a state in which the corrosion resistance property of the material is improved by the corrosion resistance of the oxide layer. The active region and the trans-passive region are corrosive environment states in which uniform corrosion and local corrosion actively occur, respectively. In FIG. 2, the black solid line represents the current of the oxidation reaction, and dash 1 and dash 2 lines represent the current density of the reduction reaction. The corrosive environment of the metal substrate is determined by the intersection of the oxidation reaction and the reduction reaction, and the corrosion rate thereof is proportional to the current density.

The present invention is characterized in that the surface of the metal substrate is coated with the oxygen reduction catalyst that promotes the oxygen reduction reaction, after measurement of the oxidation reaction of the metal substrate, so that the position of the reduction reaction line is changed from dash 1 to dash 2 so that the surface state of the metal substrate is maintained in the passive state, thereby slowing down the corrosion rate of the metal substrate, thereby improving the corrosion resistance of the metal substrate.

As shown in the right of FIG. 2, the intrinsic corrosion rate of the metal material to be protected against corrosion is a current value corresponding to the point indicated by point 1. However, due to the influence of the oxygen reduction catalyst applied to the surface of the metal substrate, the reduction reaction line rises to a high potential as shown by the dash 2 line. Thus, the surface state of the metal substrate is maintained in the passive state, and the corrosion rate at this time is a current value corresponding to the point indicated by point 2. At this time, the reduction reaction line can be controlled depending on the type of oxygen reduction catalyst and the amount of oxygen reduction catalyst applied per unit area of the surface of the metal substrate.

The corrosive environment on the surface of the metal substrate varies depending on whether or not the surface has been coated with the oxygen reduction catalyst. When the surface of the metal substrate has been coated with the oxygen reduction catalyst, an oxide layer is spontaneously formed on the surface of the metal substrate due to the reduction reaction of the catalyst. In addition, due to the corrosion resistance provided by the oxide layer, the surface of the metal substrate has significantly improved corrosion resistance even if it is in contact with a corrosive solution.

Figure 3A:
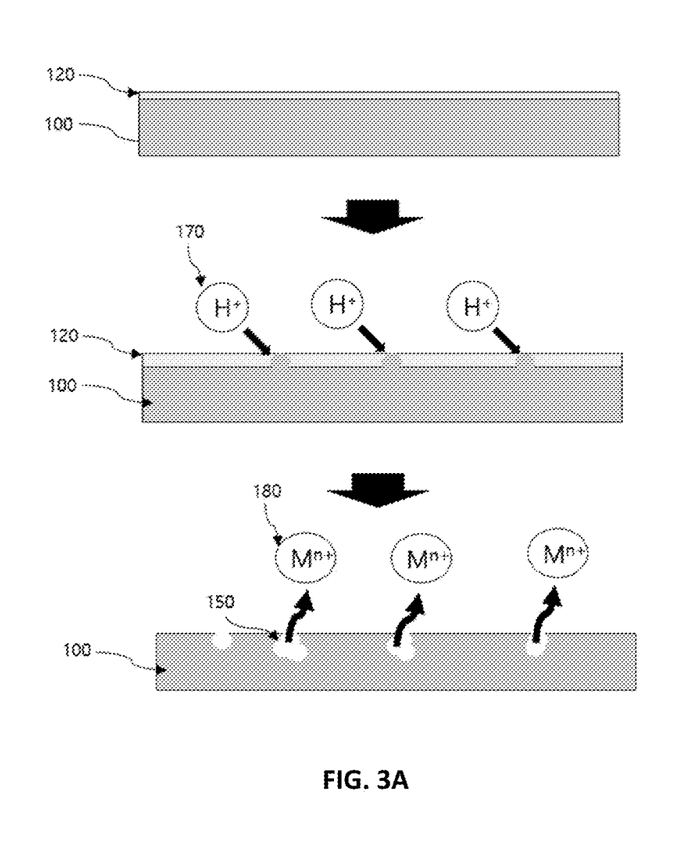
FIGS. 3A and 3B shows a metal material according to one embodiment of the present invention.
Figure 3B:
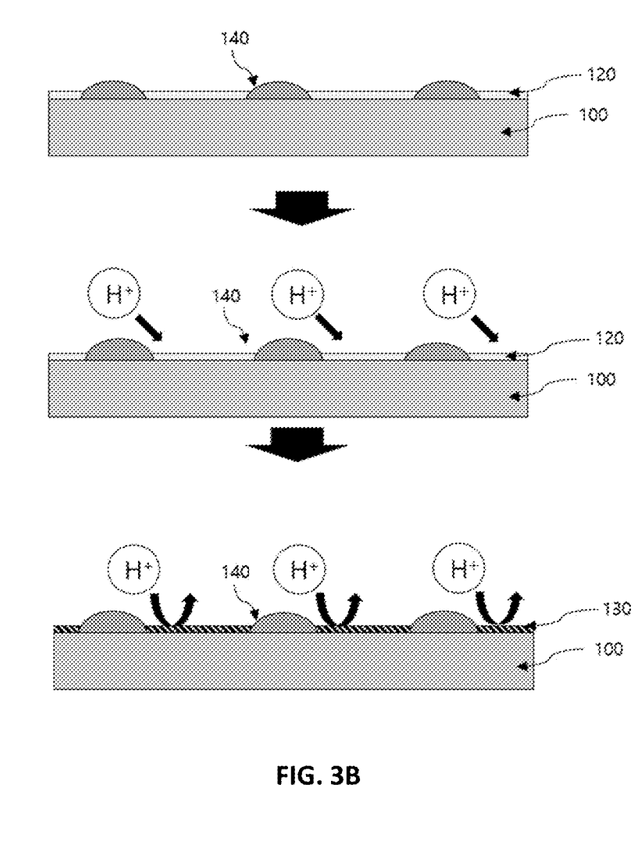

FIGS. 3A and 3B shows a metal material according to one embodiment of the present invention. Hereinafter, corrosion features before and after coating with the oxygen reduction catalyst will be described with reference to FIGS. 3A and 3B.

Referring to FIGS. 3A and 3B, a metal material according to one embodiment of the present invention comprises: a metal substrate 100; an oxide layer 130 covering at least a portion of the metal substrate 100; and an oxygen reduction catalyst 140 applied to the surface of the metal substrate in a dispersed pattern.

In this case, the metal substrate 100 may be composed of chromium (Cr), stainless steel a high-entropy alloy, or aluminum (Al). Alternatively, the metal substrate 100 may also be composed of a Co—Cr—Fe—Mn—Ni alloy.

Meanwhile, the oxygen reduction catalyst 140 may comprise either a noble metal catalyst such as platinum (Pt), palladium (Pd), iridium (Ir) or rhodium (Rh), or a transition metal (M)-N—C-based non-noble metal catalyst as Fe—N—C. Non-noble metal catalysts may be included. In this case, the transition metal (M)-N—C-based catalyst may comprise, for example, a Fe—N—C catalyst.

Referring to FIGS. 3A and 3B, in the case of the Co—Cr—Fe—Mn—Ni alloy (gray) before coating (in the case of FIG. 3A), an oxide layer 120 generated in air covers the surface, but is not sufficiently stable in an acid solution, and thus is easily dissolved by hydrogen ions 170. Thereafter, the surface of the metal substrate 100 is exposed, causing a violent corrosion reaction in which metal ions 180 are eluted.

However, after the sample is coated with the oxygen reduction catalyst 140, the oxide layer generated in air is temporarily dissolved in the acid solution, and then the stable oxide layer 130 covers the surface and interferes with the reaction with the hydrogen ions 170, thereby significantly reducing the corrosion rate. This can be confirmed by the potential within the first 600 seconds in FIG. 7. At this time, it can be confirmed that, when the oxygen reduction catalyst was applied at a density of 4 $\mu g/cm^2$ or more, the potential temporarily decreased and then recovered again. Thereby, it can be confirmed that the stable oxide layer 130 covers the surface after the unstable oxide layer 120 is dissolved.

Figure 4:
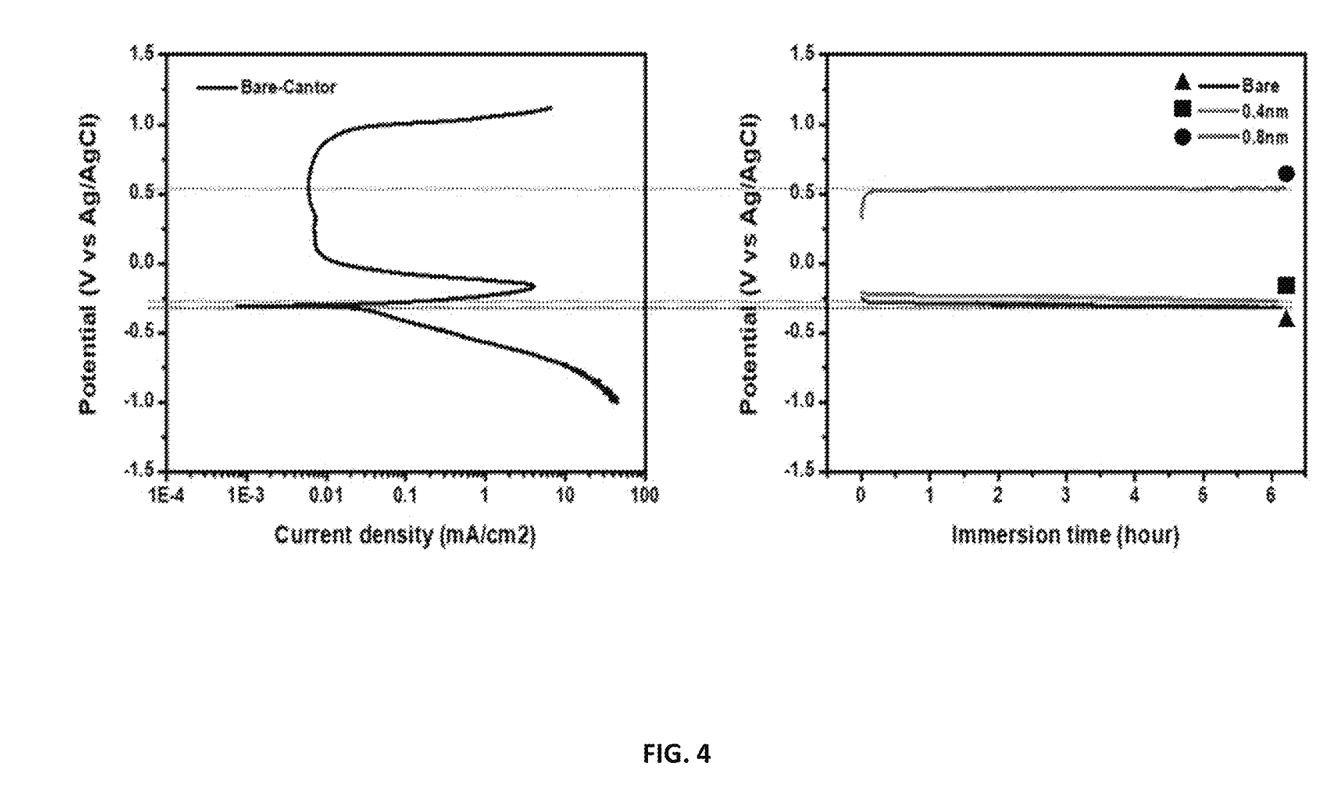
FIG. 4 shows the corrosion resistance improvement effect of the oxygen reduction catalyst depending on the thickness of a coating layer formed by a sputtering method.

FIG. 4 shows the corrosion resistance improvement effect of the oxygen reduction catalyst depending on the thickness of a coating layer formed by a sputtering method.

The oxygen reduction catalyst with which the metal material surface has been coated according to the present invention may not only slow the corrosion rate in a given corrosive environment, but also induce self-recovery even if the oxide layer formed on the surface is damaged to a certain extent. Referring to FIG. 4, it can be confirmed that, when a metal material composed of a Co—Cr—Mn—Fe—Ni alloy is coated with the noble metal platinum (Pt) to have a coating layer thickness of 0.8 nm or more, the metal material is changed to the passive state immediately after immersion in a corrosive solution as shown by the line marked with the circle. At this time, it can be confirmed that, when the thickness of the coating layer is 0.4 nm, the corrosive environment on the metal surface is not changed to the passive state as shown by the line marked with the square.

Figure 5:
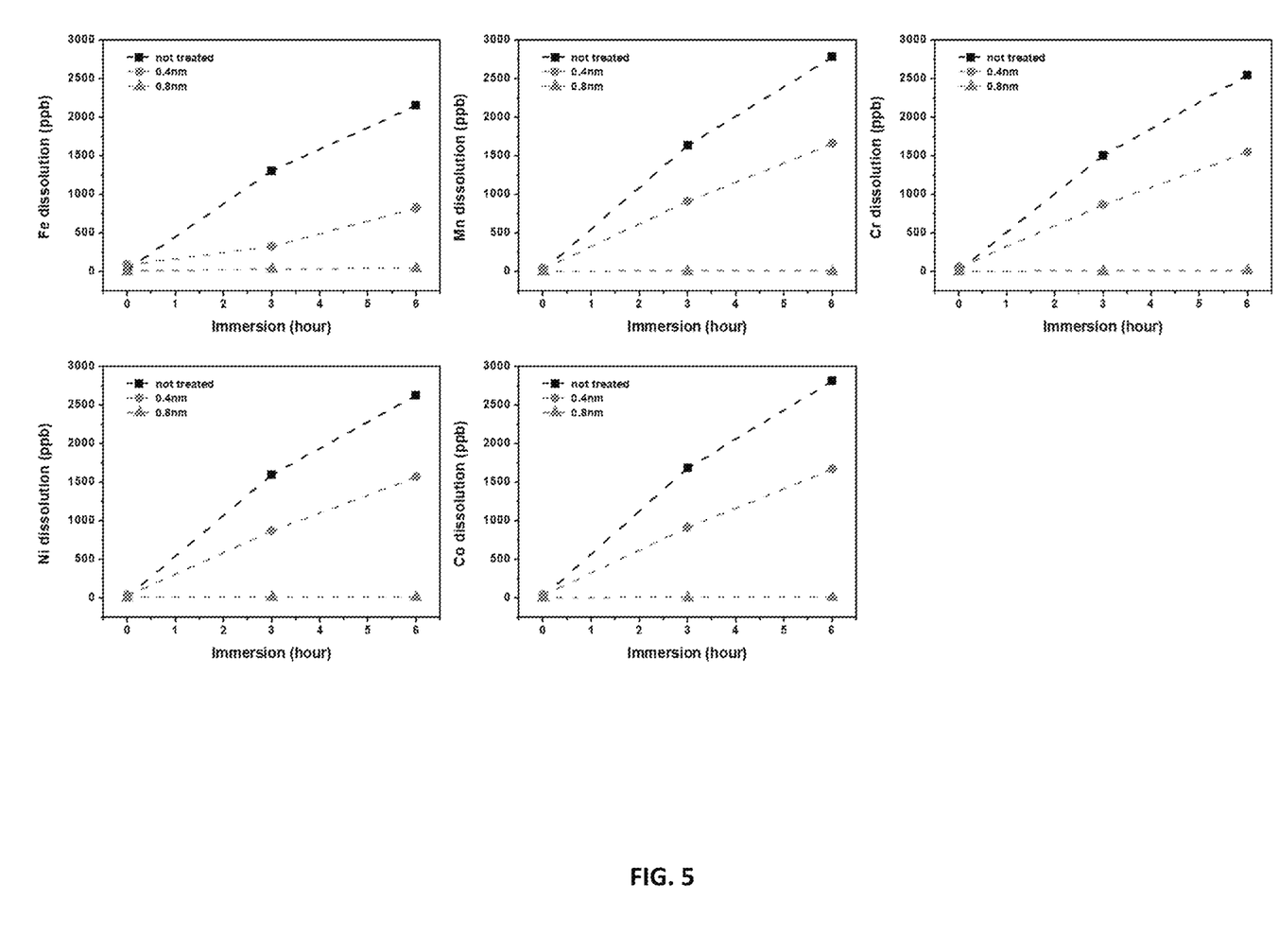
FIG. 5 shows the results of the Inductively Coupled Plasma for each element forming a metal material, which indicate that, when the surface of the metal material composed of a Co—Cr—Mn—Fe—Ni alloy is coated with an oxygen reduction catalyst by a sputtering method, the corrosion rate of the metal material surface is significantly reduced.

FIG. 5 shows the results of Inductively Coupled Plasma for each element forming a metal material, which indicate that, when the surface of the metal material composed of a Co—Cr—Mn—Fe—Ni alloy is coated with an oxygen reduction catalyst by a sputtering method, the corrosion rate of the surface is significantly reduced.

In FIG. 5, the black dotted line indicates the corrosion rate when the surface was not coated with the oxygen reduction catalyst; the red dotted line indicates the corrosion rate when an oxygen reduction catalyst coating having a thickness of 0.4 nm was formed on the surface of the metal material; and the blue dotted line indicates the corrosion rate when an oxygen reduction catalyst coating having a thickness of 0.8 nm was formed on the surface of the metal material.

Referring to FIG. 5, it can be confirmed from the concentration of each element in the corrosive environment that the surface of the metal material is hardly corroded when the oxygen reduction catalyst forms a coating layer having a thickness of 0.8 nm.

Figure 6:
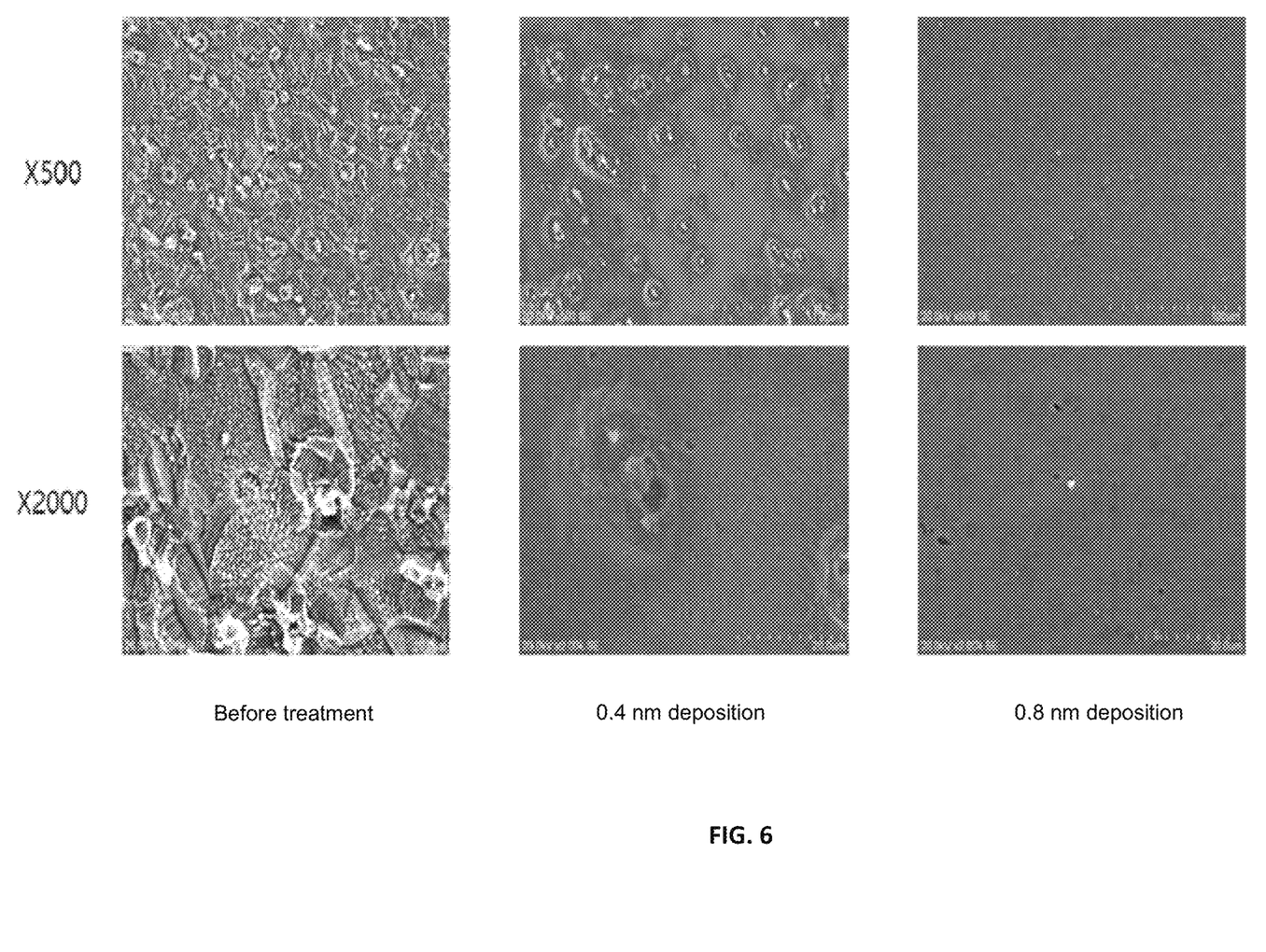
FIG. 6 shows scanning electron microscope images of the surface state of a metal material coated by a sputtering method according to the present invention.

FIG. 6 shows scanning electron microscope images of the surface of a metal material coated by a sputtering method according to the present invention.

Referring to FIG. 6, it can be confirmed that corrosion actively occurs in all parts of the surface of the metal material before the coating layer is formed thereon by sputtering, but, as the surface is coated with the oxygen reduction catalyst to a thickness of 0.4 nm or 0.8 nm, the corrosion-induced change in the microstructure on the metal material surface disappears and corrosion of the surface is not observed.

As described above, it could be confirmed that the metal material surface coated with the oxygen reduction catalyst to a certain thickness or more by the sputtering method according to the present invention had significantly increased corrosion resistance, and that the thickness of the resulting coating layer was preferably 0.8 nm or more.

Therefore, it can be confirmed that one embodiment of the method for improving the corrosion resistance of a metal material according to the present invention may impart excellent corrosion resistance to the metal material and improve the corrosion resistance, compared to the sacrificial electrode method in which the sacrificial electrode has a limited life or the coating method such as the anodizing method in which the coating layer is vulnerable to damage.

Figure 7:
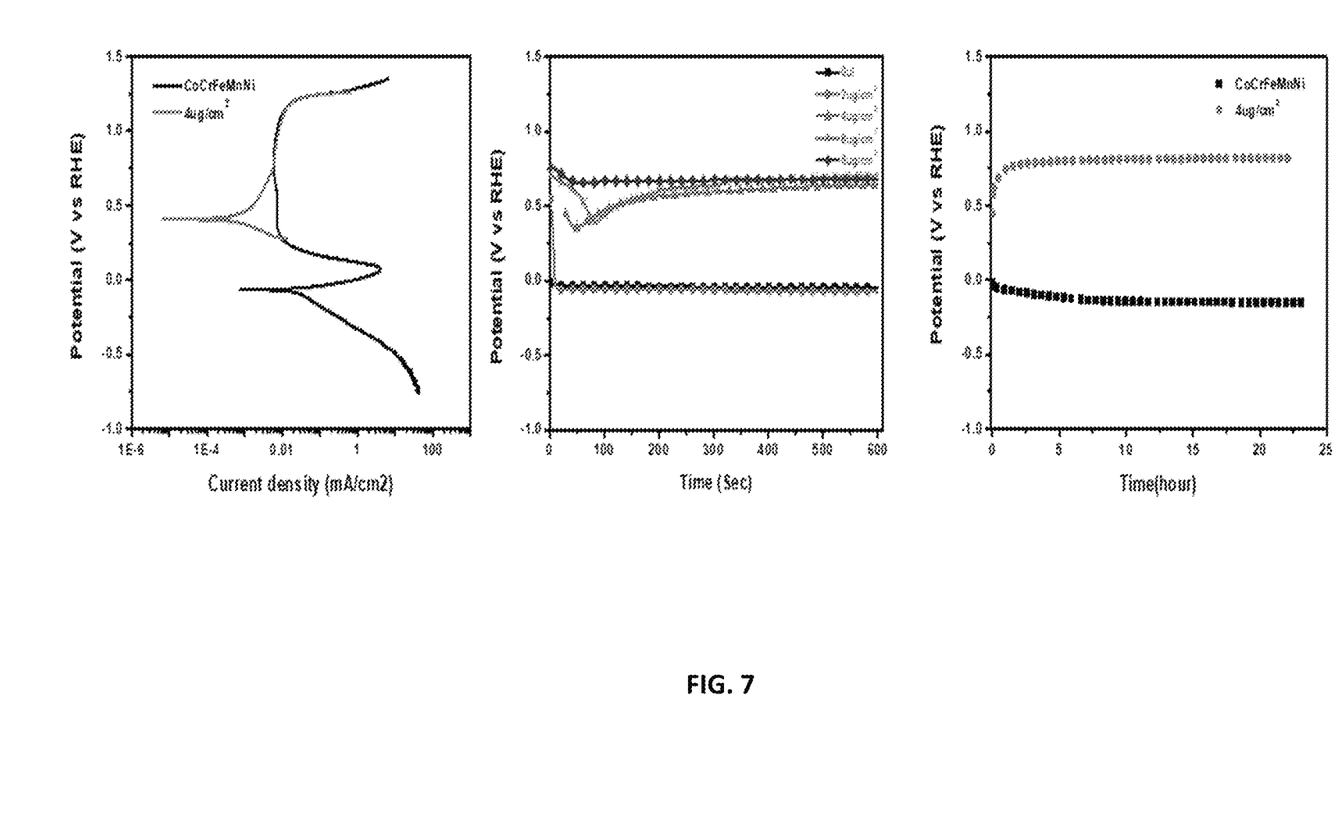
FIG. 7 shows the corrosion resistance improvement effect of the oxygen reduction catalyst depending on the amount of oxygen reduction catalyst applied and the thickness of the coating layer.

FIG. 7 shows the corrosion resistance improvement effect of the oxygen reduction catalyst depending on the amount of oxygen reduction catalyst applied and the thickness of the coating layer.

Referring to FIG. 7 showing the results of measuring the surface potential of the metal material, it could be confirmed that, when a coating layer was formed on the metal material surface using a solution containing the oxygen reduction catalyst Fe—N—C dispersed therein, the potential was maintained in the passive region when the amount of catalyst coated was 4 $\mu g/cm^2$ or more.

Figure 8:
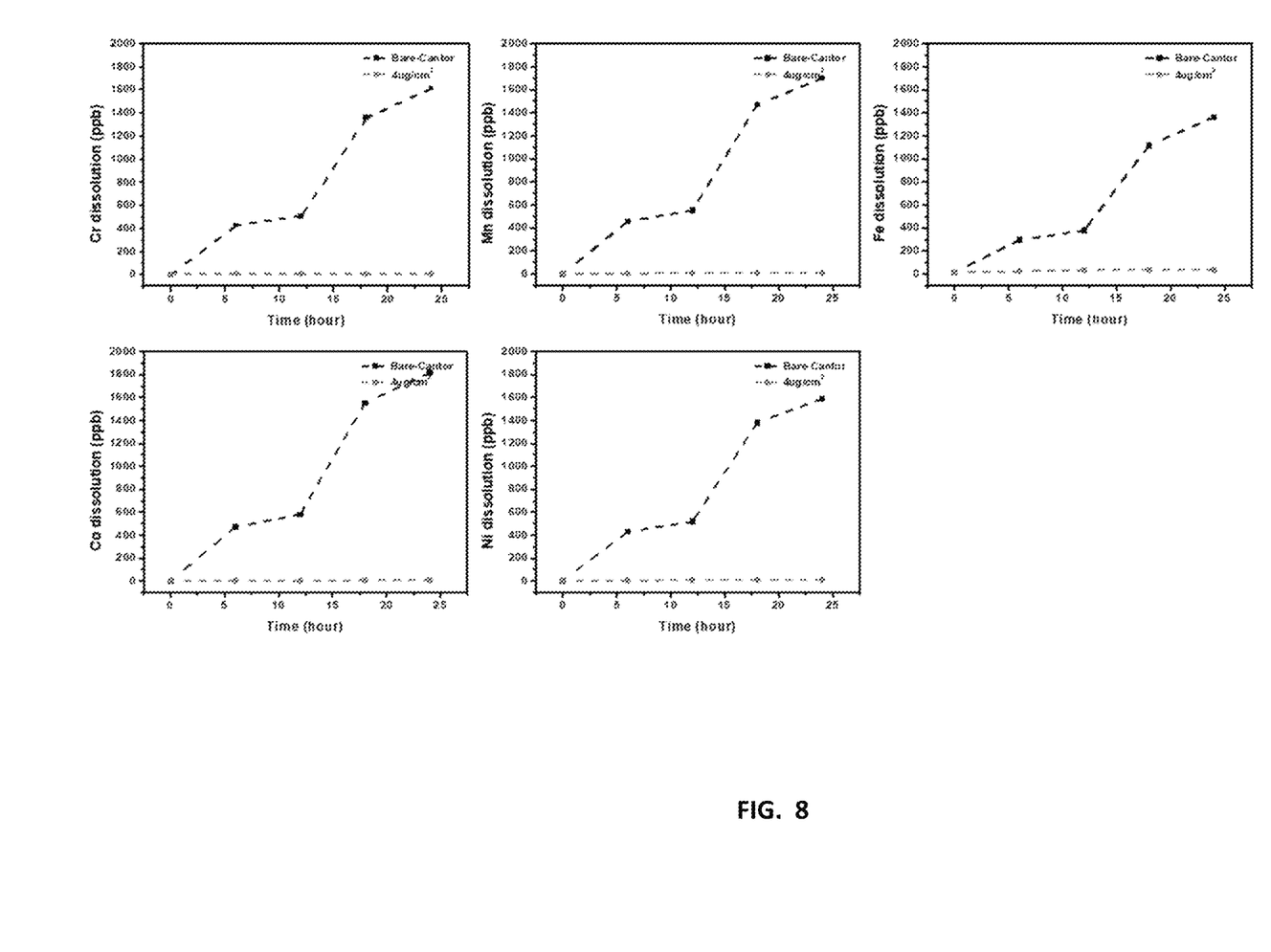
FIG. 8 shows the results of Inductively Coupled Plasma for each element forming a metal material, which indicate that, when the surface of the metal material composed of a Co—Cr—Mn—Fe—Ni alloy is coated with a Fe—N—C oxygen reduction catalyst, the corrosion rate of the surface is significantly reduced.

FIG. 8 shows the results of Inductively Coupled Plasma for each element forming a metal material, which indicate that, when the surface of the metal material composed of a Co—Cr—Mn—Fe—Ni alloy is coated with a Fe—N—C oxygen reduction catalyst, the corrosion rate of the surface is significantly reduced.

FIG. 8 shows the time-dependent change in the ion concentration of each element in a sulfuric acid solution. As shown therein, it could be confirmed that, before the coating layer was formed by spraying, corrosion on the surface of the metal material actively occurred, whereas, after the coating layer was formed on the surface of the metal material using the oxygen reduction catalyst Fe—N—C, there was almost no change in the ion concentration, suggesting that corrosion by the sulfuric acid solution hardly occurred. Referring to the graphs shown in FIG. 8, it can be seen that, there was a difference of several hundred to several thousand times on average in the ion concentration between the elements.

At this time, in the ion concentration graphs shown in FIG. 8, the high-concentration group and the low-concentration group are shown separately because there is a large difference in the amount of dissolution between the elements.

Figure 9:
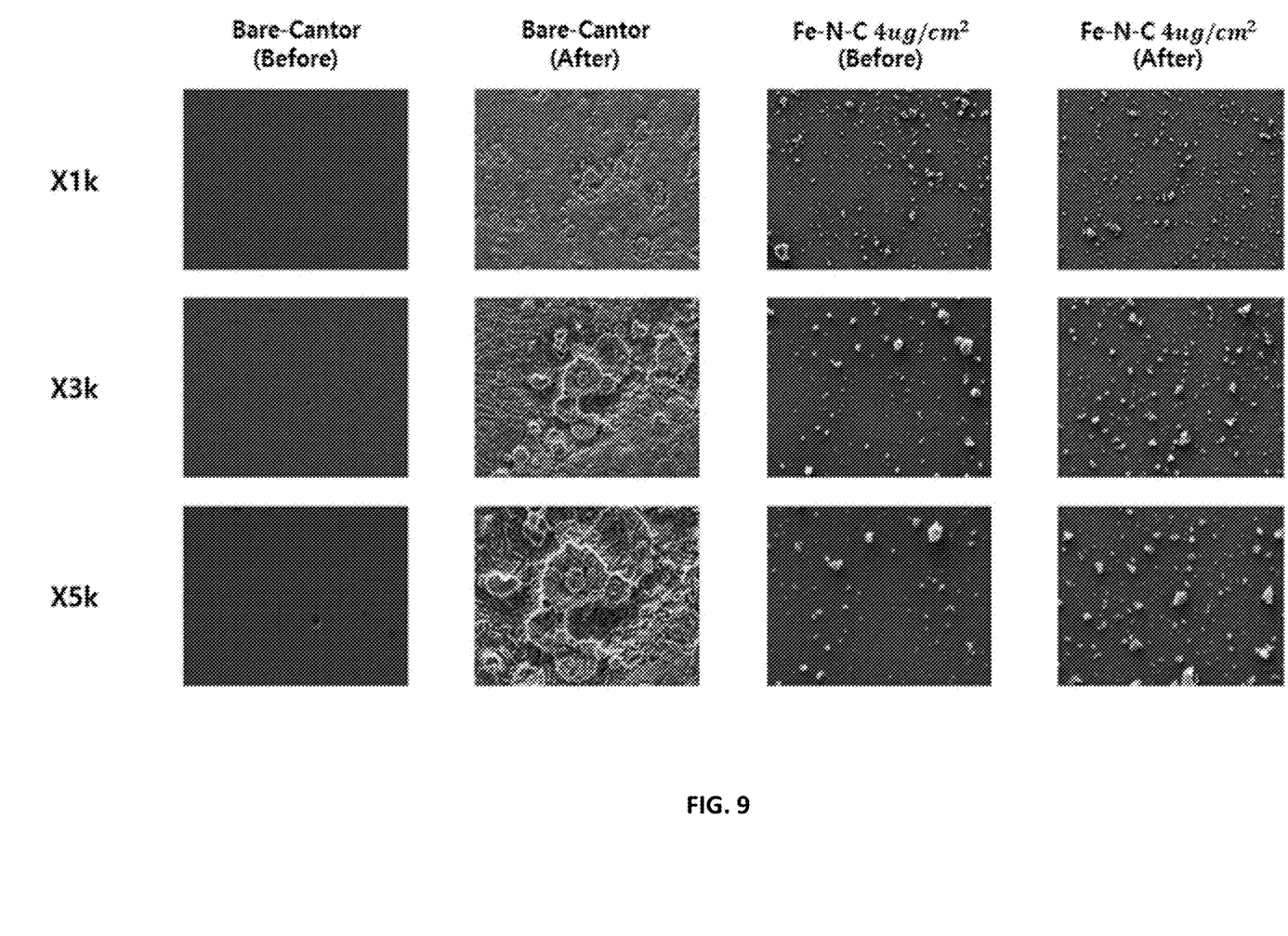
FIG. 9 depicts scanning electron microscope images showing the surface state of a metal material coated according to the present invention.

FIG. 9 depicts scanning electron microscope images showing the surface state of the metal material coated according to the present invention.

In the scanning electron microscope (SEM) images shown in FIG. 9, the expression "Bare-Cantor" indicates the surface states of a control condition before and 24 hours after natural corrosion in a sulfuric acid solution. It is confirmed that the surface corrosion proceeded very actively because the natural corrosion proceeded after the surface of the metal substrate was sufficiently ground, and it can be seen that the surface became roughened.

On the other hand, it could be confirmed that, when the coating layer was formed using the Fe—N—C dispersed solution according to Example 2 of the present invention, the surface roughness due to the sulfuric acid solution before and after exposure to the corrosive environment significantly decreased, and that corrosion hardly occurred.

At this time, it could be confirmed that the white particles present on the surface of the metal substrate were dispersed Fe—N—C particles which were well dispersed.

Meanwhile, the method for improving the corrosion resistance of a metal material according to the present invention allows an oxide layer to be formed on the surface of the metal material even in the presence of only a certain amount of oxygen. Thus, the method according to the present invention has better versatility than the conventional art methods in that it can be utilized not only under special conditions, such as forming an oxide layer by alloying of a hydrogen reduction catalyst in an acidic solution, as in the case of the previously reported Ti—Pd alloy, but also in all solutions in which the amount of dissolved oxygen is above a certain amount. In addition, in most alloys, the passive region overlaps the oxygen reduction reaction region rather than the hydrogen reduction reaction region, and thus the range of metal materials, to which the method for improving corrosion resistance according to the present invention can be applied, is also significantly wide.

In addition, the method of the present invention has a significant advantage in terms of economic efficiency in that it induces improvement in the corrosion resistance of a metal material either by forming a coating layer having a thickness of 0.8 nm or more on the surface of the metal material to be protected against corrosion through sputtering of a noble metal such as platinum (Pt) without the need to cast an expensive alloy such as a Ti—Pd alloy, or by forming a coating layer by powdering a M-N—C-based catalyst, which is a non-noble metal-based catalyst, and dispersing the powder in a mixed solution of Nafion and isopropyl alcohol (IPA), and then uniformly applying the dispersion to the surface of the metal material.

What is claimed is:

1. A method of improving a corrosion resistance of a metal substrate surface using an oxygen reduction catalyst, the method comprising an oxygen reduction catalyst coating step of coating the metal substrate surface with the oxygen reduction catalyst,
    wherein the metal substrate surface is an alloy comprising at least one selected from the group consisting of chromium (Cr), stainless steel, high-entropy alloy and aluminum (Al),
    wherein the oxygen reduction catalyst coating step comprises forming a coating layer by sputtering a noble metal, selected as the oxygen reduction catalyst, on the metal substrate surface under an argon atmosphere, and wherein the coating layer has a thickness of 0.8 nm or more.

2. The method of claim 1, wherein the noble metal is any one of platinum, palladium, iridium and rhodium.

3. The method of claim 1, wherein the metal substrate is composed of a Co—Cr—Mn—Fe—Ni alloy.

4. The method of claim 1, further comprising:
    contaminant removal step of physically removing contaminants from the metal substrate surface by grinding the metal substrate surface whose corrosion resistance is to be improved; and
    an organic substance removal step of removing an organic substance from the metal substrate surface by washing the metal substrate surface, from which the contaminants has been removed, sequentially using acetone, ethanol and distilled water.

5. A method of improving a corrosion resistance of a metal substrate surface using an oxygen reduction catalyst, the method comprising an oxygen reduction catalyst coating step of coating the metal material surface with the oxygen reduction catalyst,
    wherein the metal substrate surface is an alloy comprising at least one selected from the group consisting of chromium (Cr), stainless steel, high-entropy alloy and aluminum (Al),
    wherein the oxygen reduction catalyst coating step comprises forming a coating layer by uniformly dispersing (M)-N—C-based catalyst powder, wherein M is a transition metal, as the oxygen reduction catalyst in a mixed solution of isopropyl alcohol (IPA) and Nafion to obtain a dispersion, and applying a predetermined amount of the dispersion to the metal substrate surface, followed by drying.

6. The method of claim 5, wherein the oxygen reduction catalyst coating step comprises:
    a mixture solution preparation step of preparing a mixture solution by adding the (M)-N—C-based catalyst powder to the mixed solution of isopropyl alcohol (IPA) and Nafion;
    an ultrasonic dispersion step of uniformly dispersing the (M)-N—C-based catalyst powder by applying ultrasonic waves to the mixture solution prepared in the mixture solution preparation step;
    an application step of applying a predetermined amount of the dispersed mixture solution, in which the (M)-N—C-based catalyst powder has been uniformly dispersed through the ultrasonic dispersion step, at least once to the metal substrate surface; and
    a coating layer forming step of forming the coating layer by drying the applied dispersed mixture solution.

7. The method of claim 6, wherein the application step and the coating layer forming step are sequentially repeated at least once.

8. The method of claim 6, wherein water is further included in the mixture solution preparation step to control the concentration of the mixture solution.

9. The method of claim 5, wherein the (M)-N—C-based catalyst is a Fe—N—C catalyst, and the metal substrate is composed of a Co—Cr—Mn—Fe—Ni alloy.

10. The method of claim 9, wherein the coating layer has a density of 4 µg/cm$^2$ or more.

* * * * *